(12) United States Patent
Birkelund

(10) Patent No.: US 12,467,555 B2
(45) Date of Patent: Nov. 11, 2025

(54) CHECK VALVE DAMPING

(71) Applicant: Danfoss A/S, Nordborg (DK)

(72) Inventor: Michael Birkelund, Nordborg (DK)

(73) Assignee: DANFOSS A/S, Nordborg (DK)

( * ) Notice: Subject to any disclaimer, the term of this patent is extended or adjusted under 35 U.S.C. 154(b) by 151 days.

(21) Appl. No.: 17/440,270

(22) PCT Filed: Jan. 28, 2020

(86) PCT No.: PCT/EP2020/052011
§ 371 (c)(1),
(2) Date: Sep. 17, 2021

(87) PCT Pub. No.: WO2020/187474
PCT Pub. Date: Sep. 24, 2020

(65) Prior Publication Data
US 2022/0154850 A1 May 19, 2022

(30) Foreign Application Priority Data

Mar. 20, 2019 (EP) .................................... 19164084

(51) Int. Cl.
*F16K 47/00* (2006.01)
*F04D 27/02* (2006.01)
(Continued)

(52) U.S. Cl.
CPC ...... *F16K 47/0111* (2021.08); *F04D 27/0292* (2013.01); *F16K 15/026* (2013.01);
(Continued)

(58) Field of Classification Search
CPC .... F16K 47/0111; F16K 47/06; F16K 15/026;
Y10T 137/7852
See application file for complete search history.

(56) References Cited

U.S. PATENT DOCUMENTS 3,134,394 A 5/1964 Ohta
3,146,792 A 9/1964 Donnelly
(Continued)

FOREIGN PATENT DOCUMENTS

CN 101000046 A 7/2007
CN 201031979 Y 3/2008
(Continued)

OTHER PUBLICATIONS

English Machine Translation of DE1107038B from Espacenet (Year: 1961).*
(Continued)

*Primary Examiner* — Reinaldo Sanchez-Medina
*Assistant Examiner* — Nicole Gardner
(74) *Attorney, Agent, or Firm* — McCormick, Paulding & Huber PLLC

(57) ABSTRACT

The present invention relates to a check valve unit (1, 100, 200, 300, 400) having a shaft bearing body (10, 110, 210, 310, 410) with an at least substantially cylindrical mounting portion (11) extending along an axial direction (A) and an axially extending valve shaft (20, 120) mounted therein. The latter is displaceable along the axial direction (A). The check valve unit (1, 100, 200, 300, 400) further includes a valve head (25, 125) with a sealing surface (33, 133), wherein the valve head (25, 125) is disposed on a distal end (21) of the valve shaft (20, 120) in the axial direction (A), the distal end (21) facing away from the mounting portion (11). Further, a damping reservoir (50) is provided inside the shaft bearing body (10, 110, 210, 310, 410). A volume of the damping reservoir (50) is changed by axial movement of the valve shaft (20, 120). In order to obtain a well-defined times for opening and closing under given conditions and to make the check valve unit (1, 100, 200, 300, 400) less prone to making noise, at least two channels (46a, 46b) are provided in
(Continued)

parallel, each of them constituting a fluid connection between the damping reservoir (50) and an outside (70). The damping reservoir (50) is, apart from the channels (46a, 46b), at least substantially enclosed. Each channel (46a, 46b) has a length being at least ten times a hydraulic diameter of the respective channel (46a, 46b).

3 Claims, 5 Drawing Sheets

(51) Int. Cl.
*F16K 15/02* (2006.01)
*F04D 17/10* (2006.01)
*F04D 29/048* (2006.01)
*F25B 31/00* (2006.01)

(52) U.S. Cl.
CPC .......... *F04D 17/10* (2013.01); *F04D 27/0215* (2013.01); *F04D 29/048* (2013.01); *F25B 31/00* (2013.01)

(56) References Cited

U.S. PATENT DOCUMENTS

| | | | |
|---|---|---|---|
| 3,247,967 A * | 4/1966 | Kucmerosky | F16K 25/02 210/429 |
| 3,605,802 A * | 9/1971 | Hertell | F16K 15/063 137/516.29 |
| 4,271,862 A | 6/1981 | Snoek | |
| 4,682,531 A * | 7/1987 | Mayer | F15B 13/02 91/468 |
| 4,693,270 A | 9/1987 | Yaindl | |
| 4,747,426 A | 5/1988 | Weevers | |
| 4,890,641 A * | 1/1990 | Gavrila | F16K 17/0433 251/64 |
| 5,065,790 A * | 11/1991 | Kornas | F16K 47/011 137/538 |
| 5,857,348 A | 1/1999 | Conry | |
| 5,881,564 A | 3/1999 | Kishimoto | |
| 6,132,191 A | 10/2000 | Hugenroth | |
| 6,293,513 B1 | 9/2001 | Birkelund | |
| 6,386,089 B2 | 5/2002 | Giversen et al. | |
| 6,405,824 B1 | 6/2002 | Sørensen et al. | |
| 6,459,348 B1 | 10/2002 | Birkelund | |
| 6,668,967 B2 | 12/2003 | Sørensen et al. | |
| 6,814,101 B2 | 11/2004 | Flauzac | |
| 6,912,455 B2 | 6/2005 | Beek | |
| 6,955,331 B2 | 10/2005 | Larsen et al. | |
| 7,246,525 B2 | 7/2007 | Birkelund et al. | |
| 8,066,256 B2 | 11/2011 | Platz et al. | |
| 8,434,734 B2 | 5/2013 | Birkelund | |
| 8,584,705 B2 | 11/2013 | Hughes | |
| 8,689,582 B2 | 4/2014 | Birkelund et al. | |
| 9,309,978 B2 | 4/2016 | Hatch et al. | |
| 9,360,027 B2 | 6/2016 | Birkelund | |
| 9,383,031 B2 | 7/2016 | Shelcoviz et al. | |
| 9,416,890 B2 | 8/2016 | Nissen et al. | |
| 9,683,673 B2 | 6/2017 | Gretarsson et al. | |
| 9,739,290 B2 | 8/2017 | Lucas et al. | |
| 10,082,219 B2 | 9/2018 | Birkelund | |
| 10,197,314 B2 | 2/2019 | Birkelund | |
| 10,443,753 B2 | 10/2019 | van Beek et al. | |
| 10,502,333 B2 | 12/2019 | Rizzio | |
| 10,571,156 B2 | 2/2020 | Birkelund | |
| 10,663,077 B2 | 5/2020 | Birkelund | |
| 10,816,015 B2 | 10/2020 | Birkelund | |
| 10,989,454 B2 | 4/2021 | Uribe et al. | |
| 2006/0130903 A1 | 6/2006 | Whittaker | |
| 2010/0024891 A1* | 2/2010 | Francini | F16K 15/026 137/543.17 |
| 2015/0377378 A1 | 12/2015 | Birkelund et al. | |

FOREIGN PATENT DOCUMENTS

| | | | |
|---|---|---|---|
| CN | 101457849 A | 6/2009 | |
| CN | 102478119 A | 5/2012 | |
| CN | 102486238 A | 6/2012 | |
| CN | 102588632 A | 7/2012 | |
| CN | 203404430 U | 1/2014 | |
| CN | 203477484 U | 3/2014 | |
| CN | 103727273 | 4/2014 | |
| CN | 203686272 U | 7/2014 | |
| CN | 204140963 U | 2/2015 | |
| CN | 204553670 U | 8/2015 | |
| CN | 205118348 U | 3/2016 | |
| CN | 106402433 | 2/2017 | |
| CN | 206205913 U | 5/2017 | |
| CN | 206320363 U | 7/2017 | |
| CN | 107567560 A | 1/2018 | |
| CN | 208252854 U | 12/2018 | |
| CN | 106838386 B | 10/2019 | |
| CN | 110608303 A | 12/2019 | |
| CN | 110878857 A | 3/2020 | |
| CN | 110894877 A | 3/2020 | |
| CN | 111043351 A | 4/2020 | |
| CN | 210423843 U | 4/2020 | |
| CN | 210661524 U | 6/2020 | |
| CN | 111365496 A | 7/2020 | |
| CN | 211371374 U | 8/2020 | |
| CN | 211371375 U | 8/2020 | |
| CN | 211474891 U | 9/2020 | |
| CN | 211667210 U | 10/2020 | |
| CN | 111927988 A | 11/2020 | |
| CN | 212080262 U | 12/2020 | |
| CN | 212107048 U | 12/2020 | |
| CN | 212643659 U | 3/2021 | |
| CN | 212718206 U | 3/2021 | |
| CN | 212960019 U | 4/2021 | |
| CN | 213271164 U | 5/2021 | |
| DE | 1107038 B * | 5/1961 | ........... F16K 31/363 |
| DE | 3142331 A1 | 5/1983 | |
| DE | 3627865 A1 | 2/1988 | |
| DE | 10255066 A1 | 6/2004 | |
| DE | 102005009989 B3 | 6/2006 | |
| DE | 102013222764 | 2/2015 | |
| DE | 102017116184 A1 | 1/2018 | |
| EP | 1327810 A2 | 7/2003 | |
| EP | 1331426 A2 | 7/2003 | |
| EP | 1669703 A1 | 6/2006 | |
| EP | 1959139 A2 | 8/2008 | |
| EP | 2076940 A1 | 7/2009 | |
| EP | 2108869 A2 | 10/2009 | |
| EP | 2171731 A1 | 4/2010 | |
| EP | 2546559 | 1/2013 | |
| EP | 2788640 A | 10/2014 | |
| EP | 2818779 A1 | 12/2014 | |
| EP | 2944827 A1 | 11/2015 | |
| EP | 3098543 A1 | 11/2016 | |
| EP | 3106726 A1 | 12/2016 | |
| EP | 3499101 A1 | 6/2019 | |
| EP | 3591316 A1 | 1/2020 | |
| EP | 3660418 A1 | 6/2020 | |
| EP | 3660419 A1 | 6/2020 | |
| EP | 3712434 A1 | 9/2020 | |
| GB | 8303981 | 3/1983 | |
| GB | 2 117 091 A | 10/1983 | |
| GB | 2117091 | 10/1983 | |
| GB | 2360023 A | 9/2001 | |
| GB | 2360024 A | 9/2001 | |
| JP | H06341562 A | 12/1994 | |
| JP | 2008207482 A | 9/2008 | |
| JP | 2012007639 A | 1/2012 | |
| JP | 2017-57913 A | 3/2017 | |
| KR | 2007-0050524 A | 5/2007 | |
| KR | 100727833 B1 | 6/2007 | |
| WO | 2006116998 A1 | 11/2006 | |
| WO | 2006116999 A1 | 11/2006 | |
| WO | 2008040353 A1 | 4/2008 | |
| WO | 2008141647 A1 | 11/2008 | |
| WO | 2009000271 A1 | 12/2008 | |
| WO | 2009010057 A1 | 1/2009 | |

(56) References Cited

FOREIGN PATENT DOCUMENTS

| WO | 2009049625 A1 | 4/2009 |
| --- | --- | --- |
| WO | 2009089835 A1 | 7/2009 |
| WO | 2009138086 A1 | 11/2009 |
| WO | 2010025726 A1 | 3/2010 |
| WO | 2010045946 A1 | 4/2010 |
| WO | 2013084063 A1 | 6/2013 |
| WO | 2014121796 A1 | 12/2015 |
| WO | 2017005843 A2 | 1/2017 |
| WO | 2018109036 A1 | 6/2018 |
| WO | 2019115555 A1 | 6/2019 |
| WO | 2020164865 A1 | 8/2020 |
| WO | 2020187468 A | 9/2020 |
| WO | 2021037966 A1 | 3/2021 |
| WO | 2021037970 A1 | 3/2021 |

OTHER PUBLICATIONS

International Search Report for PCT/EP2020/052011 Dated Feb. 25, 2020.

* cited by examiner

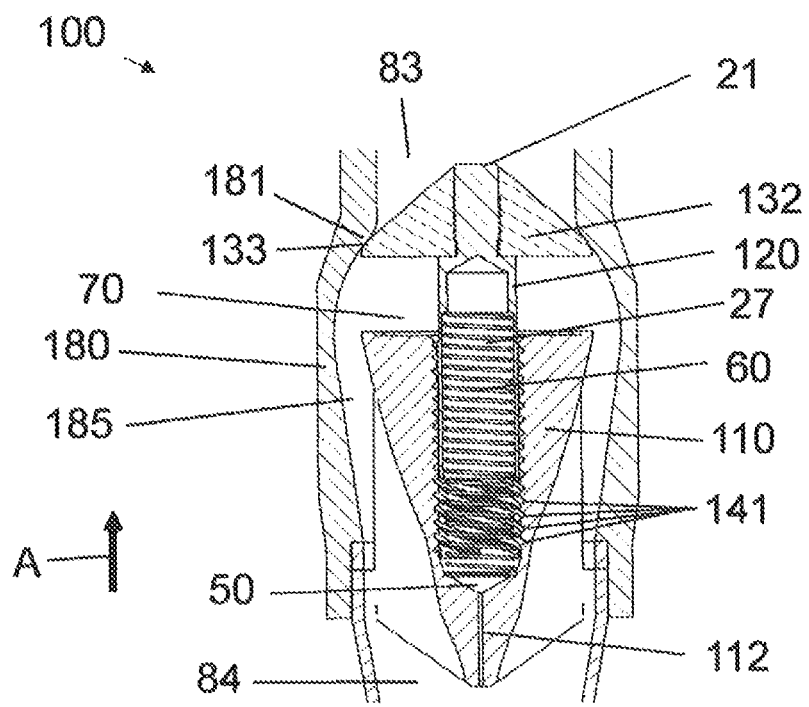
Fig. 3
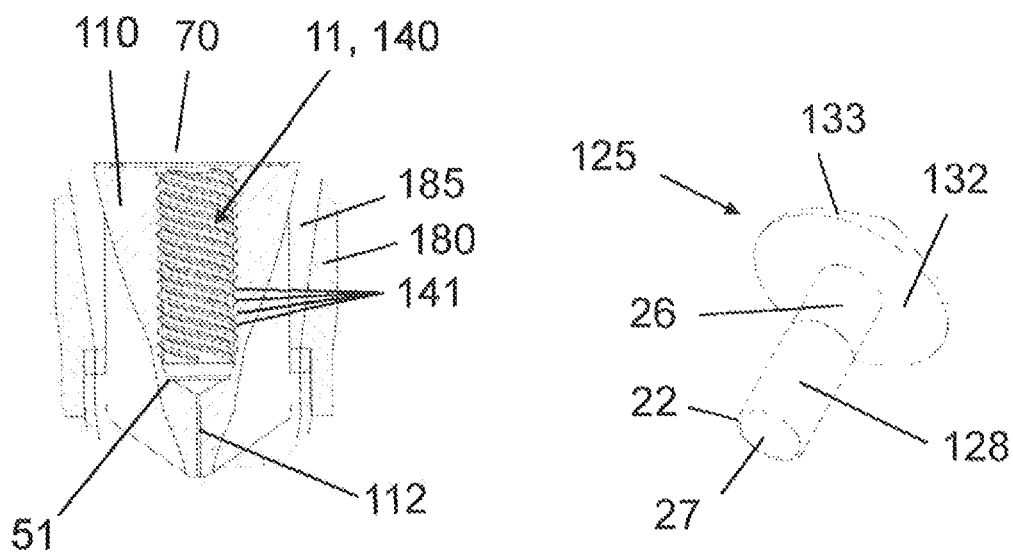
Fig. 4
Fig. 5

CHECK VALVE DAMPING

CROSS-REFERENCE TO RELATED APPLICATIONS

This application is a National Stage application of International Patent Application No. PCT/EP2020/052011, filed on Jan. 28, 2020, which claims priority to European Application No. 19164084.6 filed on Mar. 20, 2019, each of which is hereby incorporated by reference in its entirety.

TECHNICAL FIELD

The invention relates to a check valve unit comprising a shaft bearing body comprising an at least substantially cylindrical mounting portion extending along an axial direction. The check valve further comprises a valve shaft mounted in the mounting portion, wherein the valve shaft extends along the axial direction and is displaceable along the axial direction, and a valve head comprising a sealing surface, wherein the valve head is disposed on a distal end of the valve shaft in the axial direction, the distal end facing away from the mounting portion. The check valve also comprises a damping reservoir inside the shaft bearing body, wherein a volume of the damping reservoir is changed by movement of the valve shaft with regard to the shaft bearing body along the axial direction.

BACKGROUND

A check valve unit is known, for example, from U.S. Pat. No. 9,309,978 B2.

It is known that check valve units can be used in connection with a compressor in a cooling or refrigerating system. For example, such a check valve unit might protect the compressor from damages caused by undesired, sudden backflow of a refrigerant into the compressor. On the one hand, the check valve unit should open even if there is only a small pressure drop along a forward flow direction. Hence, the check valve unit does not impede the forward flow of the refrigerant. However, the check valve unit should close as fast as possible, if a reverse pressure drop and reverse flow of the refrigerant occurs. In particular, short times for opening and closing the check valve unit are desired. For ensuring short opening and closing times, a damping with regard to displacement of its valve shaft has to be small. Hence, less force is needed to quickly open or close the check valve unit.

However, if the check valve unit has a low damping, it is prone to produce undesired noise. Especially if the check valve is only partially open, for example due to a small mass flow of the refrigerant passing through it, the valve shaft can continuously move back and forth in an uncontrolled manner. In other words, the check valve is fluttering. This causes vibrations and hence undesired noise. The noise can disturb people, for example people working in an office.

In more detail, usually the damping is automatically obtained in that a relatively long piston is guided in a bottomed cylinder, wherein there is only a small difference between the diameters of an inner circumferential surface of the cylinder and an outer circumferential surface of the piston rod. At a closed end of the cylinder, a damping reservoir is constituted. If the piston rod is displaced along an axial direction away from the closed end, fluid from outside the cylinder has to pass between the inner circumferential surface of the cylinder and the outer circumferential surface of the piston rod to get into the damping reservoir. By this, the pressure in the damping reservoir is equilibrated with an ambient pressure outside the cylinder, for example in a fluid flow path of a valve. Therefore, a certain force is required to pull the piston rod further out of the cylinder.

Vice versa, a certain force is required to press the piston rod into the cylinder in the axial direction towards the closed end of the cylinder. Due to an axial movement of the piston rod, the pressure in the damping reservoir is increased. Fluid from the damping reservoir can pass between the inner surface of the cylinder and the piston rod in order to compensate the reduction of the damping reservoir's volume. Hence, a certain force is required to push the piston rod further into the cylinder as well.

Summed up, if the piston rod is moved, fluid is forced through the small diameter difference and, due to a viscosity of the fluid, a damping force counteracting the movement of the piston rod is obtained. Ideally, damping characteristics with a damping force being proportional to an absolute value of a velocity of the piston rod can be achieved. However, very small tolerances are necessary for providing sufficient damping and proper damping characteristics. As a result, corresponding check valve units are very expensive to produce and prone to failures.

More particular, the usual damping arrangement exhibits variations in damping due to eccentricity and manufacturing tolerances. Normally, the piston rod is not centered by special means. For a given piston rod velocity, the damping force will decrease with a factor 2.5 if the piston rod is moved away from centered position to a most eccentric position in the cylinder. Often, the difference between the diameters of the inner circumferential surface of the cylinder and the outer circumferential surface of the piston rod can vary by a factor of 1.5: For example, if a difference between the diameters of 0.05 mm is desired and if the machining tolerances for both the cylinder and the piston rod are ±0.005 mm, this results in a minimal difference of said diameters and hence of a gap of only 0.04 mm and a maximum gap of 0.06 mm. A radial gap size hence can vary by a factor of 1.5. However, said variation of the radial gap size by a factor of 1.5 can lead to the damping force being different by a factor 3.4 between a minimal damping force (maximum radial gap size) and a maximum damping force (minimal radial gap size). Taking those two sources of nonconformances (i.e. eccentricity and machining tolerances) together, this often results in a factor 5 to 10 regarding the possible variations of the damping force. Hence, it is very difficult to ensure precisely determined damping characteristics.

According to another concept, equalization holes are provided for controlling the flow of fluid into or out of the damping reservoir. However, the equalization holes lead to a damping force being proportional to an absolute value of a velocity of the piston rod in the power of two and the damping is insufficient especially for slow oscillations. On the other hand, considerable damping occurs if the check valve unit is closed quickly. Hence, it is hard to realize short closing times.

In a check valve according to JP H06-341562 A, a single spiral groove is formed on an outer periphery of a poppet valve and used as a throttle.

SUMMARY

The object underlying the invention is to provide a check valve unit exhibiting a well-defined time for opening and closing under given conditions and being less prone to making noise.

The above object is solved by a check valve unit according to claim 1.

In particular, the check valve unit comprises:

A shaft bearing body comprising an at least substantially cylindrical mounting portion extending along an axial direction;

a valve shaft mounted in the mounting portion, wherein the valve shaft extends along the axial direction and is displaceable along the axial direction;

a valve head comprising a sealing surface, wherein the valve head is disposed on a distal end of the valve shaft in the axial direction, the distal end facing away from the mounting portion; and a damping reservoir inside the shaft bearing body, wherein a volume of the damping reservoir is changed by movement of the valve shaft with regard to the shaft bearing body along the axial direction;

Furthermore, in the check valve according to the present invention, at least two channels are provided in parallel, each of the channels constituting a fluid connection between the damping reservoir and an outside, wherein the damping reservoir is, apart from the channels, at least substantially enclosed, wherein each channel has a length being at least ten times a hydraulic diameter of the respective channel.

In general, the term "channels are provided in parallel" (or "parallel channels") does not require that the at least two channels are geometrically parallel. The term shall solely indicate that the at least two channels establish at least two different fluid connections through which a fluid can pass in parallel in order to flow from the damping reservoir to the outside and vice versa. In other words, a first and a second channel are not parallel in this meaning if the same part of the fluid first has to flow through the first channel and then further through the second channel when flowing from the damping reservoir to the outside (or vice versa). In this case, the first channel and the second channel are arranged "in series" ("consecutive channels"). Furthermore, it has to be understood that it is not required that the fluid connections between the damping reservoir and the outside are established solely by the parallel channels alone. For example, an additional conduit or several additional conduits may be provided in series to one or more of the parallel channels in order to complete the fluid connection between the damping reservoir and the outside.

The length of the channels is large compared to their hydraulic diameters. The channels hence comprise a large inner surface facing the fluid inside the channel. The importance of boundary effects for fluid flowing through the channels is high. Therefore, a laminar flow of within the channels is facilitated. The effect is considerably increased by providing at least two channels because the individual channels can be smaller in comparison to the case, in which all of the fluid has to pass through one single channel. Hence, the flow of fluid between the damping reservoir and the outside is precisely determined by the channels. On the other hand, with at least two channels in parallel, the individual channels can be shorter and therefore the size of the check valve unit is kept small.

The at least two parallel channels are configured as a "bottleneck" for fluid flowing between the damping reservoir and the outside. Hence, the damping is at least substantially determined by the at least two channels. In other words, the check valve unit is configured that a flow resistance for the fluid flowing between the damping reservoir and the outside is at least substantially determined by the at least two parallel channels.

The check valve unit according to the present invention exhibits well-defined and optimal damping characteristics regarding axial displacement of the valve shaft. Therefore, well-defined opening and closing times can be assured. Furthermore, undesired oscillations are avoided. For example, valve fluttering is prevented even if the check valve unit is only partially open.

In addition, the check valve unit according to the present invention exhibits quick and well-defined closing at surge in a centrifugal compressor.

The hydraulic diameter $d_H$ of an individual one of the channels may be calculated from an cross-sectional area $A_c$ of the channel in a plane perpendicular to a longitudinal direction of the channel and an inner circumference $O_c$ of said channel as follows: $d_H = 4 * A_c / O_c$.

In general, the hydraulic diameter of the individual channel may vary along the longitudinal direction of the channel. The term "hydraulic diameter" preferably refers to a minimum hydraulic diameter or to an effective hydraulic diameter. The effective hydraulic diameter is the hydraulic diameter of a uniform cylindrical channel having the same length as the actual channel of the embodiment and exhibiting substantially the same flow resistance as the actual channel, wherein the latter may be of a more complex shape.

Preferably, each channel has a length being at least 25 times the hydraulic diameter of the respective channel, more preferably at least 50 times. In these cases, the channels are long enough for obtaining even stronger influence of the inner surface of the channels facing the fluid flowing therein.

However, the length of each channel is preferably equal or less than 2000 times its hydraulic diameter, more preferably less than 1000 times. Otherwise, the flow resistance would be too high and could impair fast closing of the check valve unit.

The check valve unit may be configured to allow the fluid to flow along a forward flow direction but to prevent the fluid from flowing in a backward flow direction opposite to the forward flow direction.

The sealing surface may be configured for sealingly abutting to a corresponding valve seat. For example, the sealing surface can have at least substantially the shape of an annular line. According to another example, the sealing surface might be of an at least frusto-conical shape. As a further example, the shape of the sealing surface can at least substantially correspond to a spherical zone.

The valve shaft with the valve head and the sealing surface (i.e. a valve shaft assembly) are configured to be displaced from a closing position along the axial direction. A maximum stroke of the valve shaft (and the valve head with its sealing surface) in the axial direction is the range between the closing position and a fully opened position. The displacement of the valve shaft can cause opening and closing of the check valve unit.

According to a preferred embodiment of the present invention, a diameter of the sealing surface is in the range from 15 mm to 300 mm, more preferably from 20 mm to 150 mm, most preferably from 25 mm to 100 mm. For example, the diameter of the sealing surface can be 27 mm. With those the dimensions, the check valve unit is adapted for use in typical refrigeration cycles, for example.

According to another aspect, the maximum stroke of the valve shaft is preferably within a range from 4 mm to 100 mm, more preferably from 5 mm to 50 mm, and most preferably from 6 mm to 35 mm. Such a maximum stroke is small enough for short opening and closing times of the check valve unit but exhibits a sufficient large opening for not impeding substantially the desired fluid flow through the check valve unit along the forward flow direction.

In particular, the closing position may be an axial position of the valve shaft in which the valve head protrudes furthest from the shaft bearing body.

The valve head is at least axially fixed with respect to the valve shaft. Preferably, the valve head is axially and rotationally fixed to the valve shaft. For example, the valve head can be formed integrally with the valve shaft.

Additionally or alternatively, a total mass of the valve shaft assembly comprising the valve shaft and the valve head is less than 0.2 kg, more preferably less than 0.1 kg, and most preferably less than 0.02 kg.

A proximal side of the valve shaft with a proximal end thereof is inserted into an interior of the shaft bearing body. The valve shaft is mounted by the mounting portion of the shaft bearing body. In particular, the mounting portion holds and guides the valve shaft in an axial displaceable manner.

The damping reservoir can partially extend into a cavity of the valve shaft located at the distal end of the valve shaft, wherein the cavity is open at the distal end of the valve shaft.

In a preferred embodiment of the invention, the proximal end of the valve shaft constitutes a distal end of the damping reservoir. This embodiment requires few parts and is easy and cheap to manufacture.

In a preferred embodiment of the present invention, the valve head includes a sealing element, wherein the sealing surface is located on the sealing element. The sealing element is at least axially fixed to the valve head, more preferably axially and rotationally fixed to the valve head. The sealing element can be made of PFFE, for example.

Preferably, the check valve unit further comprises a resilient element forcing the valve shaft in the axial direction towards the closing position. In other words, the resilient element exhibits a restoring force for closing the check valve unit. Consequently, the valve head and the sealing surface are forced in the closing position together with the valve shaft. The valve shaft can be displaced by an external force counteracting the resilient force. For example, an opening force for displacing the valve shaft in the axial direction towards the fully opened position may arise from a difference between an upstream-side pressure acting on a distal side of the valve head and a downstream-side pressure acting on a proximal side of the valve head. In this case, the opening force results from the upstream-side pressure being higher than the downstream-side pressure and/or by an effective area of the distal side, on which the upstream-side pressure acts. Said effective area may be larger than an effective area of the proximal side of the valve head, on which the downstream-side pressure acts. The upstream-side and downstream-side are defined with respect to the aforementioned forward flow direction.

According to an aspect of the invention, the check valve unit has a central unit comprising at least the valve head and the shaft bearing body, wherein the central unit is configured such that it has a drop-like outer shape when the check valve unit is fully open. Therefore, the flow resistance for fluid flowing through the check valve around the central unit is very low. This increases the energy efficiency of circuits in which the check valve unit is used.

More preferably, the resilient element is a spring, for example a compression spring. The spring may be mounted between the valve shaft and the shaft bearing body. In particular, a part of the shaft bearing body constituting the proximal side of the damping reservoir may comprise a spring seat. The spring seat is adapted to mount a proximal end of the spring. The spring seat may be of an at least substantially annular shape. Most preferably, the spring extends partially through the cavity of the valve shaft.

More preferably, the restoring force of the resilient element mentioned above (which may be the compression spring) is adapted to close the check valve unit without differential pressure. For example, the restoring force exerted in the closing position may correspond to at least 100% of a gravitational force due to the mass of the valve shaft assembly, most preferably at least 120% or at least 140%. Hence, closing of the check valve unit is ensured for every spatial orientation of the check valve unit. For example, if the total mass of the valve shaft assembly is 0.02 kg, the restoring force in the closing position might be 0.24 N.

Additionally or alternatively, the spring constant of the resilient element may be less than 0.1 N/mm, more preferred less than 0.02 N/mm. The spring constant should be as low as possible such that only a small pressure drop along the forward flow direction is necessary to keep the check valve unit in the fully opened position.

According to a further aspect of the invention, the check valve unit preferably is installed and/or used in an at least substantially vertical configuration, wherein the gravitational force due to the mass of the valve shaft assembly forces the same towards its closing position. Consequently, for displacing the valve shaft assembly away from its closing position, at least its gravitational force has to be overcome. For example, the required opening force can be the sum of the gravitational force of the valve shaft assembly and the resilient force of the resilient member. In the vertical configuration, the axial direction is parallel to a direction of gravity.

According to another aspect of the invention, the valve shaft and/or the valve head are made of aluminum and/or Polytetrafluoroethylene (PFFE).

Preferably, the check valve unit is configured to close in less than 2 s if a backward pressure drop occurs, more preferably in less than 0.5 s, most preferably in less than 0.2 s. The backward pressure drop would cause the fluid to flow in the backward flow direction if the check valve unit did not close. With such a fast closing time, elements in a fluid cycle such as a refrigerant cycle can be safely protected from damages.

As noted above, the volume of the damping reservoir changes according to the axial position of the valve shaft. The check valve unit is configured so that fluid flows into or out of the damping reservoir through the channels if the valve shaft is axially displaced in order to dampen said axial movement.

In particular, the more the valve shaft is displaced in the axial direction away from its closing position, the more reduced is the volume of the damping reservoir. Hence, fluid in the damping reservoir flows into the channels from the damping reservoir, further through the channels, and finally to the outside. The viscosity of the fluid causes a damping force counteracting axial movement of the valve shaft.

Vice versa, the more the valve shaft is displaced in the axial direction towards its closing position, the more increased is the volume of the damping reservoir. Hence, fluid enters from the outside into the channels, further flows through the channels, and finally enters into the damping reservoir. Again, the viscosity of the fluid causes the damping force counteracting axial movement of the valve shaft.

The outside may refer to an outside of the shaft bearing body. In particular, the outside may be a main flow channel for the fluid passing the check valve unit if the check valve unit is open.

With the present invention, the damping force is mainly determined by the fluid flowing through the channels. As the dimensions of the channels are large compared to the manufacturing tolerances, there is only a low sensitivity of the damping characteristics to the manufacturing tolerances. Therefore, with the present invention, well-defined damping characteristics are ensured.

The desired damping characteristic can be finely adjusted by the number of the channels, the lengths of the channels and the shapes of the channels, for example.

In a further preferred embodiment of the invention, the damping reservoir is located in the shaft bearing body. For example, the damping reservoir may be constituted of the cavity formed in the shaft bearing body and a proximal portion of an interior of the shaft bearing body. The damping reservoir may be delimited at its distal end by the proximal side of the valve shaft. At its proximal end, the damping reservoir may be delimited by a wall of the shaft bearing body.

Preferably, a width, a length, a depth, a diameter and/or a shape is the same for all channels. With this, a more uniform flow of fluid in all the channels is facilitated. Hence, imbalances and undesired moments can be avoided.

Additionally or alternatively, the channels are configured such that the flow resistance for the fluid flowing through the channels may be at least substantially the same for all of the channels. In this context, substantially the same may mean that said flow resistance of two different channels does not differ by more than 40%, more preferably by not more than 20%, and most preferably by not more than 10% for given identical conditions.

According to another preferred aspect of the invention, the width, the depth, the diameter and/or a cross-sectional shape of each channel do not or do at least not substantially change along the longitudinal direction of the respective channel. Therefore, the fluid can flow in a uniform manner through each channel.

Preferably, the diameter and/or the width of the channels perpendicular to their longitudinal direction is in the range from 0.05 mm to 3 mm, more preferably from 0.08 mm to 1 mm, most preferably from 0.1 mm to 0.5 mm.

According to another aspect of the invention, the length of the channel along its longitudinal direction may be at least 5 mm, more preferably at least 8 mm. Consequently, the flow resistance of the channels is high enough for the laminar flow of the fluid.

The hydraulic diameter of each channel is preferably at least 0.07 mm, more preferably at least 0.1 mm. Additionally or alternatively, the hydraulic diameter of each channel is preferably equal to or less than 1 mm at the maximum, more preferably 0.5 mm, most preferably 0.3 mm.

In general, it is not necessary that the channels be of a straight-line shape. For example, they might be provided as helical grooves (see below). However, in a preferred embodiment of the invention, the channels are of straight-line shape.

Preferably, at least three channels, more preferably at least four channels, and most preferably at least five channels are provided. Hence, the fluid flow is divided into more channels. There is a sufficient number of channels that the individual channels are small enough to ensure laminar flow of the fluid therein even if a large flow of fluid occurs during fast movement of the valve shaft assembly.

With a given total area of cross-section of all channels perpendicular to the respective fluid flow direction inside the channels (referred to as total channel cross-section), the damping characteristics are the better the channels are provided. This is explained in the following: Supposed all channels are of the same or at least of a similar shape, providing more channels without increasing the total channel cross-section means that the channel cross section (perpendicular to the respective fluid flow direction therein) of each single channel is reduced. In other words, the single channels are getting smaller. If the channels are small enough, a laminar flow within the channels is ensured. Providing more channels facilitates to make the single channels small enough such that the damping force is proportional to the absolute value of the velocity of the valve shaft instead of being proportional to said velocity in the power of two.

On the other hand, the number of channels should not be excessively high in order to allow a cost-efficient, fast, and reliable production of the check valve unit. Thus, the number of the channels is preferably 200 at the maximum, more preferably 100 at the maximum, and most preferably 50 at the maximum. Furthermore, if the single channels are too small, they may be prone to clogging even by very small dirt and/or abrasion particles.

Of course, it is highly advantageous if the number of channels is within the upper and lower limits mentioned above.

A circumferential direction is perpendicular to the axial direction. The end of the valve shaft in the axial direction opposite to its distal end is denoted as its proximal end. The damping reservoir may be located at the side of the proximal end of the valve shaft.

A piston diameter is the diameter of an outer circumferential surface of the valve shaft in an engagement portion of the valve shaft, wherein the engagement portion is a portion of the valve shaft along the axial direction, which is configured to engage with the mounting portion for mounting the valve shaft therein. The engagement portion is provided at the proximal side of the valve shaft.

In a preferred embodiment of the present invention, the check valve unit exhibits a Reynolds number of less than 2300 for flow of a predetermined fluid between the damping reservoir and the outside. The flow occurs at least mainly through the channels. The Reynolds number is an indicator for the flow characteristics. If the Reynolds number is less than 2300, the damping force is at least substantially proportional to the absolute value of the velocity of the displacement of the valve shaft. However, it should be noted that a part of the flow between the valve shaft and the shaft bearing body might occur at an area of engagement between the shaft bearing body and the valve shaft. The area of engagement is the area at which the mounting portion of the shaft bearing body engages with the engagement portion of the valve shaft, in other words, the contact and sliding area between the mounting portion and the engagement portion. A location and/or a size of the area of engagement may vary depending on the axial position of the valve shaft or not.

More preferably, the predetermined fluid comprises air, the refrigerant R134a, the refrigerant R410a, and/or $CO_2$. Additionally, the predetermined fluid may comprise up to 5 mass-% of lubricants, in particular oil. Alternatively, the predetermined fluid may be free of oil, and most preferably be free from any lubricant. The viscosity of R134a and of R410a may be in the range from 10 µPa·s to 20 µPa·s for given operating conditions.

According to a preferred aspect of the present invention, fluid flowing between the damping reservoir and the outside has to pass the total length of the channels independently from the axial position of the valve shaft. Consequently, the damping characteristics are independent from the axial position of the valve shaft.

According to another aspect of the present invention, the check valve unit comprises a drain passage constituting a further fluid connection between the damping reservoir and an outside of the shaft bearing body (in addition to the channels). For example, if the fluid (like a refrigerant) passing through the check valve unit comprises oil, a part of the oil may get inside the damping reservoir through the channels. There is a risk that the oil is trapped in the damping reservoir and fills up the latter at least partly. As the oil is nearly incompressible, an effective volume of the damping reservoir is decreased in this case. This might impede the damping characteristics and even diminish the possible stroke for the valve shaft. With the additional drain passage, oil trapped in the damping reservoir can leave the damping reservoir through the drain passage. Hence, the oil is pumped out of the damping reservoir through the drain passage when the valve shaft moves proximally. The drain passage may open into the damping reservoir with an inner opening and may open to the outside with an outer opening, for example to the main flow channel.

For example, the drain passage may open into the damping reservoir at a bottom region of the damping reservoir. The bottom region might be defined by the direction of gravity. Oil trapped in the damping reservoir will collect in the bottom region and hence flow out of damping reservoir through the drain passage more easily.

More preferably, the drain passage is constituted from a drain hole extending through a reservoir wall separating the damping reservoir from the outside of the shaft bearing body. In particular, the reservoir wall can be part of the shaft bearing body.

In a more preferred embodiment of the invention, the drain passage comprise a drain check valve, for example a check flap. The drain check valve may be provided within the drain passage, at its inner opening, or at its outer opening. The drain check valve ensures that oil can be pumped out of the damping reservoir but it prevents fluid and oil from entering into the damping reservoir from the outside through the damping passage because this could impede the damping characteristics. Most preferably, the drain check valve is configured such that it only opens when a predetermined pressure drop from the damping reservoir to the outside is reached.

Some of the channels or all of the channels may be provided in a channel portion. In other words, said channels are grouped together in one single channel portion. The channel portion may be provided in one single unit. This considerably facilitate the production of the check valve unit and reduce its costs. Furthermore, the size of the check valve unit is decreased by grouping the channels together.

Preferably, the diameter of the outer circumferential surface of the valve shaft is smaller in a middle part between the engagement portion and the valve head in the axial direction than the piston diameter.

In a preferred embodiment of the invention, the check valve comprises a circumferential groove portion, which is disposed on an outer circumferential surface of the valve shaft or on an inner circumferential surface of the mounting portion and extends along the axial direction, wherein the channels are formed by parallel helical grooves provided in the groove portion.

In this case, each of the helical grooves constitutes one channel and hence the fluid connection between the outside and the damping reservoir. Furthermore, in this case, the channel portion is formed by the groove portion. As the grooves constitute the channels in this embodiment, naturally, any features described with regard to the channels may apply to the grooves. In more detail, the channels are confined by the surfaces of the respective helical groove and a surface of a counterpart. If the groove portion is disposed on the inner circumferential surface of the mounting portion, the surface of the counterpart is the outer circumferential surface of the valve shaft. Vice versa, if the groove portion is disposed on the outer circumferential surface of the valve shaft, the surface of the counterpart is the inner circumferential surface of the mounting portion.

With the grooves being helical, their total length and their total surface is larger compared to straight channels. Therefore, the importance of boundary effects is increased which helps to ensure the laminar flow inside the helical grooves. Furthermore, the wear due to axial displacement of the piston rod is evenly distributed in the circumferential direction. This would not be the case with straight grooves along the axial direction.

Parallel helical grooves have the same helical pitch. Therefore, different helical grooves do not cross each other. Thus, a more uniform flow of fluid in each helical groove is ensured. At least two helical grooves are provided in order to obtain flow force symmetry for better concentricity and less wear.

If the groove portion is located at the outer circumferential surface of the valve shaft, the groove portion may correspond to the engagement portion.

The helical grooves may occupy at least 20% of the circumferential surface of the groove portion. For example, the helical grooves may occupy at least 20% of the inner circumferential surface of the mounting portion within the groove portion, if the groove portion is located at the inner circumferential surface of the mounting portion, or the helical grooves may occupy at least 20% of the outer circumferential surface of the valve shaft within the groove portion, if the groove portion is located at the outer circumferential surface of the valve shaft. More preferably, the helical grooves occupy at least 25% of the groove portion, even more preferably at least 30%, most preferably at least 50%.

In a more preferred embodiment of the present invention, all helical grooves are equally spaced apart in the circumferential direction. This also helps to avoid imbalances and undesired moments and a risk of jamming of the valve shaft is reduced.

More preferably, a length of the groove portion in the axial direction corresponds to at least 20% of a length of the valve shaft in the axial direction, more preferably at least 35%, most preferably at least 50%. Additionally or alternatively, the length of the groove portion may be equal to or less than 50 mm, more preferably less than 25 mm. By this, the size of the check valve unit can be kept small.

Regarding the number of the channels, it is referred to above. Specifically, a number of parallel helical grooves may be between 5 and 25. With an increasing number of parallel helical grooves, a better distribution of the flow through the helical grooves and the corresponding forces in the circumferential direction is achieved. This leads to better concentricity and less and more evenly distributed wear between the valve shaft and the mounting portion. If the groove portion is provided at the valve shaft, the more helical grooves are provided maintaining the total area of cross-section, the less the valve shaft is mechanically weakened by the helical grooves.

In detail, the depth of the helical grooves is in the range from 0.1 mm to 1 mm. Additionally or alternatively, the depth of the helical grooves is in the range from 1% to 5% of the piston diameter. The depth may be defined along a radial direction perpendicular to both the axial direction and the circumferential direction. Hence, the helical grooves are flat enough to exhibit laminar flow of fluid but can be easily manufactured. Furthermore, these dimensions are suitable for adequate manufacturing tolerances and expected possible eccentricity.

More preferably, the width of the helical grooves in the circumferential direction is in the range from 0.15 mm to 1.5 mm. Additionally or alternatively, the depth of the helical grooves is in the range from 1.5% to 7.5% of the piston diameter of the valve shaft. Hence, the helical grooves are narrow enough to exhibit laminar flow of fluid but can be easily manufactured.

As the dimensions of the helical grooves are large compared to the manufacturing tolerances, there is only a low sensitivity of the damping characteristics to the manufacturing tolerances. The helical grooves are deeper than the possible eccentricity and hence the damping characteristics are less influenced by undesired eccentricity of the valve shaft and/or the mounting portion. This further supports well-defined damping characteristics.

According to yet another more preferred aspect of the present invention, a difference between the piston diameter and the inner circumference of the mounting portion is in the range from 0.05 mm to 0.15 mm. Additionally or alternatively, the difference between the piston diameter and the inner circumference of the mounting portion is in the range from 0.4% to 0.8% of the piston diameter. Therefore, the expected tolerances and the possible eccentricity are sufficiently taken into account.

In a more preferred embodiment of the present invention, the outside is in fluid connection with a distal end opening of each helical groove facing towards the distal end of the valve shaft and the damping reservoir is in fluid connection with a proximal end opening of each helical groove facing away from the distal end of the valve shaft. This ensures proper fluid flow and damping characteristics.

More preferably, a number of helical turns of the helical grooves is an integer. If there is, due to eccentricity, a first zone with a minimum distance between the outer circumferential surface of the valve shaft in the engagement portion and the diameter of the inner circumferential surface of the mounting portion and a second zone with a maximum distance between the outer circumferential surface of the valve shaft in the engagement portion and the inner circumference of the mounting portion due to eccentricity, fluid flowing through the helical grooves will have to pass through the first zone and through the second zone for the same number of times.

Additionally or alternatively, the number of helical turns of the helical grooves is in the range from 1 to 10, most preferably in the range from 1 to 3, in particular 1, 2, or 3. With more helical turns, the helical grooves are more difficult to produce and it is more difficult to provide a sufficient number of grooves. If the helical grooves do not exhibit enough helical turns, for example less than one complete helical turn (i.e., if the helical groove does not wind at least 360° in the circumferential direction along its entire length), the resulting damping behavior may not be satisfying.

In a more preferred embodiment, a radial gap is provided between the outer circumferential surface of the valve shaft and the surrounding shaft bearing body outside the area of engagement. In particular, the gap may be provided distally and/or proximally from the area of engagement According to a more preferred embodiment of the present invention, the groove portion is located at the outer circumferential surface of the valve shaft. With this embodiment, the helical grooves can be easily machined on said outer circumferential surface before the valve shaft is inserted into the valve body. This facilitates the productions and reduces the manufacturing costs. Furthermore, the mass of the valve shaft is reduced by the helical grooves. This is beneficial for short close and opening times.

Most preferably, the groove portion corresponds to the engagement portion and the diameter of the outer circumferential surface in the groove portion is larger than the diameter of the outer circumferential surface of the valve shaft in the middle part of the valve shaft, said middle part being located in the axial direction between the groove portion and the valve head. The middle part does not directly engage with the mounting portion. Correspondingly, the gap is provided between the outer circumferential surface of the valve shaft in the middle part and the surrounding shaft bearing body. The gap is configured to allow fluid to flow between the distal ends of the helical grooves and the outside of the shaft bearing body. In this configuration, the groove portion does not need to extend into the outside of the shaft bearing body but nevertheless the fluid can flow into and out of the helical grooves.

Additionally or alternatively, the check valve unit is configured so that the groove portion (which corresponds to the engagement portion) remains completely inside the shaft bearing body, in particular within the mounting portion, independently from the axial position of the valve shaft. The size of the area of engagement is hence independent of the axial position of the valve shaft. Furthermore, fluid flowing between the damping reservoir and the outside has to pass the total length of the helical grooves independently from the axial position of the valve shaft.

In another more preferred embodiment of the present invention, the groove portion is located at the mounting portion.

Similar to the embodiment described above, in order to constitute the gap, the diameter of the outer circumferential surface of the valve shaft in the engagement portion may be larger than in the middle part of the valve shaft, the middle part being distally adjacent to the engagement portion in the axial direction. In particular, the middle part may extend up to the valve head.

Most preferably, in the respective embodiments mentioned, the diameter of the outer circumferential surface in the middle part of the valve shaft is smaller than the diameter of the outer circumferential surface in the engagement portion by at least 100% of the depth of the helical grooves, extraordinarily preferred by at least 200% of the depth of the helical grooves. Hence, the gap is large enough for not impairing fluid flow severely.

Alternatively or additionally, in order to constitute the gap, the diameter of the inner circumferential surface in the groove portion may be smaller than a diameter of the inner circumferential surface of the interior of the shaft bearing body in a distal part of the shaft bearing body, said distal part being located in the axial direction between the groove portion and a distal end of the interior of the shaft bearing body.

Most preferably, the check valve unit is configured that the groove portion remains engaged over its complete axial length with the valve shaft independently from the axial position of the valve shaft. Thus, fluid flowing between the damping reservoir and the outside has to pass the total length of the helical grooves independently from the axial position of the valve shaft.

According to another preferred embodiment of the present invention, the check valve includes an insert, wherein the channels are formed by the insert. In particular, the channel may comprise the channel portion. For example, the insert may be of an at least substantially cylindrical shape.

The insert may be press-fit to the check valve unit, in particular to a receiving portion of the check valve unit. Hence, the insert as such is produced separately. This considerably facilitates the production of the channels. Alternatively, the insert may be fixed to the check valve unit by means of threads.

According to a more preferred embodiment, the insert is fixed within the valve shaft. Correspondingly, the valve shaft includes the receiving portion for the insert. Most preferably, the insert is arranged at a distal end of the cavity within the valve shaft. For example, the insert may be press-fit into the distal end of the cavity. For each channel, a distal end of the channel may be in fluid connection with the outside and a proximal end of the channel may be in fluid connection with the damping reservoir. For example, the proximal ends of the channels open directly into the damping reservoir. A conduit may be provided in the valve shaft in series with the channels for establishing the fluid connection between the outside and the distal openings of the channels. The conduit may extend in the radial direction.

According to another, more preferred embodiment, the insert is fixed directly to and within the shaft bearing body (for example by press-fit as noted above). Hence, the shaft bearing body comprises the receiving portion in this case. Even more preferably, the insert is arranged at a proximal end of the damping reservoir. For each channel, a proximal end of the channel may be in fluid connection with the outside and a distal end of the channel may be in fluid connection with the damping reservoir. For example, the distal openings of the channels open directly into the damping reservoir. A conduit may be provided in the shaft bearing body in series with the channels for establishing the fluid connection between the outside and the proximal openings of the channels. The conduit may extend in the axial direction.

Most preferably, a hydraulic diameter of the conduit is considerably larger (for example by more than 50%) than a sum of the hydraulic diameters of all channels. Hence, the conduit has no significant influence on the damping characteristics of the check valve unit.

In a more preferred embodiment, the channels extends parallel to the axial direction. In other words, the longitudinal direction of each channel is parallel to the axial direction.

More preferably, channels are formed completely inside the insert. The individual channels may be of a rectangular (for example quadratic) shape or a round (for example circular, elliptic, oval) shape. Different channels may be of different shapes or all channels may be of the same shape. The channels may be distributed in a regular pattern within the insert. In particular, all channels may be formed completely inside the insert.

Furthermore, channels may be formed by empty spaces between solid rods of the insert extending along the axial direction. For example, the insert may comprise an outer wall having a sleeve-like shape and extending in the axial direction and several cylindrical rods arranged parallel to the axial direction radially inside the outer wall. The rods may be fixed into the outer wall by press-fit. It is also possible to mount several rods, for example such cylindrical rods, parallel to the axial direction directly within the guiding part (i.e. without additional outer wall), for example by press-fit. In this case, the plurality of rods constitute the insert.

More preferably, the channels are formed by grooves on a radially outer surface of the insert (i.e. an outer surface of the insert seen in the radial direction). In this case, each channel is confined by surfaces of the respective groove and a surface of the receiving portion facing the groove.

In particular, the channels may be formed by straight grooves, which are parallel to the axial direction. An insert comprising such straight grooves can be produced reliably, fast, and cost-efficient. The straight grooves may be equally distributed on the radially outer surface of the insert.

Alternatively, channels are formed by helical grooves on the radially outer surface of the insert. Said helical grooves on the radially outer surface may be formed like the helical grooves in the groove section described above. The advantages of helical grooves are evident from above. However, it is more difficult and more expensive to manufacture helical grooves than straight grooves. Most preferably, all channels are formed by helical grooves on the radially outer surface.

In general, depending on the individual requirements for different check valve units, identical check valve units but different inserts can be produced. Hence, the check valve unit exhibiting specific damping characteristics can be manufactured by producing the specific insert configured to exhibit said desired damping characteristics when being properly fixed to the check valve unit and then fixing this insert to the check valve unit. In particular, the damping characteristics of the check valve unit are determined by the number and/or the shape of the channels of the insert.

Where an insert is used, a difference between an outer circumferential diameter of the insert and an inner circumferential diameter of the receiving portion before mounting the insert may be about 0.5%, but at least less than 0.7%. If channels are formed on the radially outer surface of the insert, said diameter difference may be less than 40% of the depth of the channels.

The check valve unit may also comprise two inserts. For example, it may comprise a first insert being fixed within the valve shaft and being arranged at the distal end of the cavity within the valve shaft and a second insert being fixed directly to and within the shaft bearing body and being arranged at the proximal end of the damping reservoir.

Accordingly, the invention also relates to the use of the insert having at least two parallel channels in the check valve unit in order to obtain predetermined damping characteristics of the check valve unit. In particular, the insert and/or the check valve may comprise the features and advantages as described above and/or below.

Preferably, the check valve unit further comprises a valve seat, wherein the sealing surface of the valve head sealingly abuts the valve seat when the valve shaft is in the closing position and wherein the sealing surface is displaced away from the valve seat when the valve shaft is displaced in the axial direction away from the closing position. In other words, the check valve unit is closed when the valve shaft is in its closing position and the check valve unit is open when the valve shaft is not in its closing position. The fluid is prevented from flowing through the check valve unit when the valve shaft is in its closing position. However, the fluid can flow through the check valve (in particular pass between the sealing surface and the valve seat) if the valve shaft is not in the closing position.

A shape of the valve seat may be adapted to the shape of the sealing surface (and/or vice versa). Examples for the shape of the sealing surface are mentioned above.

More preferably, the check valve unit comprises a housing including the valve seat, wherein the shaft bearing body is fixed to the housing. Most preferably, the valve seat and the shaft bearing body are formed integrally with the housing. Hence, the ruggedness and compactness of the check valve unit are improved. In particular, the housing can be manufactured by 3D printing. For example, the housing and/or the shaft bearing body can be metal printed. The metal may comprise or consist of titanium, aluminum, and steel.

According to another aspect of the present invention, the check valve unit more preferably exhibits stable partial opening at least down to 15% of the rated mass flow of the check valve unit, most preferably down to 10%. As mentioned below, known check valve units without the well-defined damping characteristics according to the present invention are prone to oscillations if they are only partially open.

More preferably, the check valve unit is a straight flow valve. Therefore, the flow of the fluid during operation does not need to be deflected and the flow resistance of the open check valve unit is decreased. Apart from that, the straight flow valve configuration needs less space and is easier to include in fluid circuits, for example a refrigerant circuit.

For example, the check valve unit according to the present invention can be used for protecting a centrifugal compressor. The check valve unit may be part of the compressor. Alternatively, the check valve unit may be provided outside the compressor, for example in an outlet pipe connected to an outlet of the compressor.

BRIEF DESCRIPTION OF THE DRAWINGS

Preferred embodiments of the invention will now be described with reference to the drawings, in which:

FIG. 3 shows a cross-sectional view of a second embodiment of a check valve unit according to the present invention with a drain hole, wherein the channels are formed by helical grooves in a groove portion which is located at an inner circumferential surface a shaft bearing body;

FIG. 4 shows a cross-sectional view of the shaft bearing body of the check valve unit of FIG. 3 without a valve shaft assembly;

FIG. 5 shows a perspective view of a valve shaft of the check valve unit of FIG. 3;

DETAILED DESCRIPTION

Figure 1:
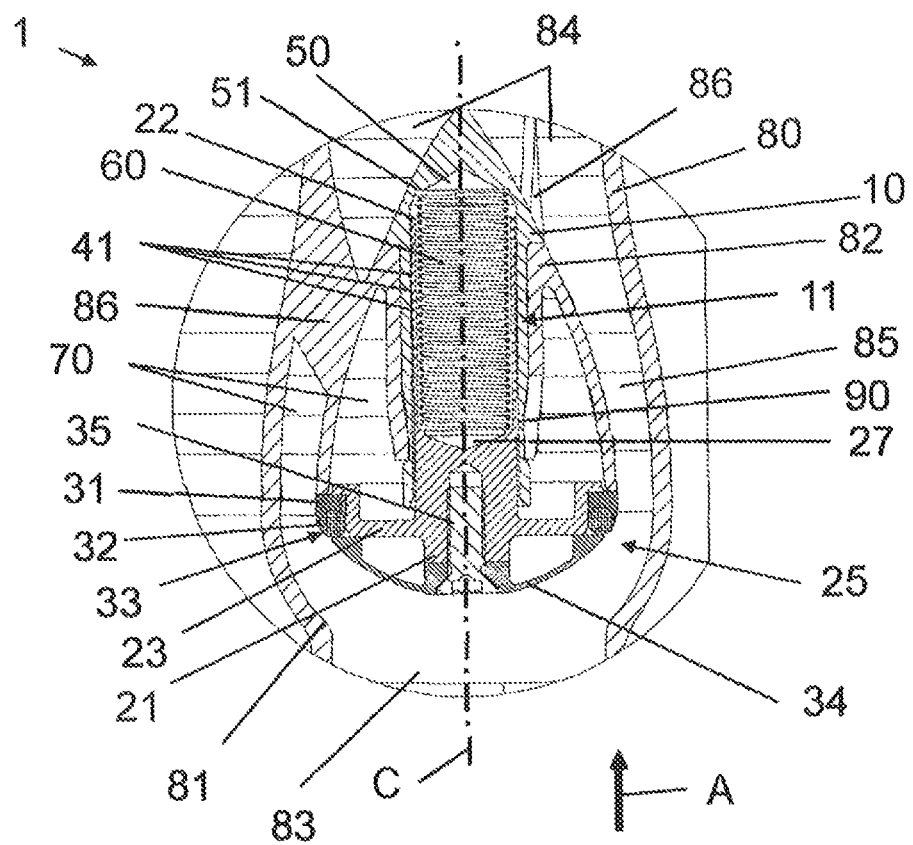
FIG. 1 shows a cross-sectional view of a first embodiment of a check valve unit according to the present invention with a housing comprising a valve seat in an open state, wherein the channels are formed by helical grooves in a groove portion which is located at an outer circumferential surface of a valve shaft.

FIG. 1 shows a cross-sectional view of a first embodiment of a check valve unit 1 according to the present invention with a housing 80 comprising a valve seat 81 and a body holder 82. Both the valve seat 81 and the body holder 82 are integrally formed with the housing 80. In more detail, the body holder 82 is connected to an outer wall of the housing 80 by three support arms 86. Due to the view, only two of the support arms 86 are visible in FIG. 1.

The housing 80 with the body holder 82 is produced by metal printing. For example, it can be made of titanium, titanium alloy, aluminum, aluminum alloy, and/or steel. In particular, it can be made of AISI 316.

In an interior of the housing 80, a shaft bearing body 10 is fixed to the body holder 82. A substantially rod-shaped interior is provided in the shaft bearing body 10.

The shaft bearing body 10 extends along a central axis C and is rotationally symmetric to said central axis C. The central axis C is parallel to an axial direction A. An opening of the interior to an outside 70 is located in the axial direction A at a distal end of the shaft bearing body 10 and faces towards the valve seat 81.

A proximal side of a valve shaft 20 is inserted into the interior of the shaft bearing body 10. In this embodiment, an inner circumferential surface of the shaft bearing body 10 delimiting the interior in a radial direction perpendicular to the axial direction A acts as a mounting portion 11 for holding the valve shaft 20 in the shaft bearing body 10. In particular, the mounting portion 11 holds and guides the valve shaft 20 such that it is displaceable in the axial direction A between a closing position and a fully opened position of the valve shaft 20, said fully opened position being depicted in FIG. 1.

In the proximal side of the valve shaft 20, which is inserted into the shaft bearing body 10, a substantially rod-shaped cavity 27 is formed in the valve shaft 20. The cavity 27 opens at a proximal end 22 of the valve shaft 20. The cavity 27 and a proximal end portion of the interior of the shaft bearing body 10 are hence in fluid connection and form a damping reservoir 50. A compression spring 60 is mounted between a distal end of the cavity 27 in the axial direction A and a spring seat 51. The spring seat 51 is disposed at a proximal end of the interior of the shaft bearing body 10. The spring 60 forces the valve shaft 20 in the axial direction A towards the valve seat 81. For example, a spring constant of the spring 60 may be 0.01 N/mm.

A valve head 25 is disposed at a distal end 21 of the valve shaft 20. In this embodiment, the valve head 25 consists of a distal flange 23 of the valve 20 formed integrally with the latter and extending in the radial direction, a head cap 34, a sealing holder 31, a sealing element 32, and a screw 35. The sealing element 32 is a sealing ring exhibiting a sealing surface 33 for sealingly abutting the valve seat 81 when the valve shaft 20 is in the closing position. In particular, the sealing surface 33 of the embodiment of FIG. 1 has the shape of an annular line.

The head cap 34 is fixed to the distal end 21 of the valve shaft 20 by means of the screw 35. The screw 35 is threaded into a corresponding threaded hole. Said threaded hole is disposed in the middle of the distal end 21 and proximally extends along the central axis C. The head cap 34 is configured for guiding fluid from a fluid inlet 83 of the check valve unit 1 to the flow passage 85 when the check valve unit 1 is open.

The sealing element 32 is fixed between the head cap 34 and the sealing holder 31. The sealing holder 31 is fixed to an outer radial end of the distal flange 23 of the valve shaft 20. By this, a valve shaft assembly comprising the valve shaft 20, the sealing holder 31, the sealing element 32, head cap 34, and the screw 35 can be assembled in an easy, quick, and cost-efficient manner. The valve shaft assembly includes the moving parts of the check valve unit 1.

In this specific embodiment, the valve shaft assembly is made of aluminum and Polytetrafluoroethylene (PFFE) and has a total mass of 0.01 kg. Hence, if the check valve unit is installed in a vertical orientation as depicted in FIG. 1, a gravitational force of approximately 0.1 N supports the resilient force of the spring 60 in closing the check valve unit 1.

If it is not certain in which spatial orientation the check valve unit 1 will be installed and/or used, a restoring force of the spring 60 must be sufficient to keep the valve shaft assembly reliably in the closing position independent of said spatial orientation when there is no pressure drop in a forward flow direction. In particular, if the check valve unit 1 is installed upside down compared to the orientation shown in FIG. 1, the spring 60 has to overcome the gravitational force of 0.1 N of the valve shaft assembly. In order to keep the check valve unit 1 reliably closed when there is no pressure drop in the forward flow direction, the resilient force of the spring 60 may, for example, correspond to 130% of the gravitational force (i.e. 0.13 N in the given example) when the check valve unit 1 is in closed. If the valve shaft assembly is moved away from its closing position, the resilient force of the spring 60 increases according to its spring constant. When the valve shaft assembly is in its fully opened position, the resilient force of the spring 60 may be, for example, about 0.2 N.

Figure 2:
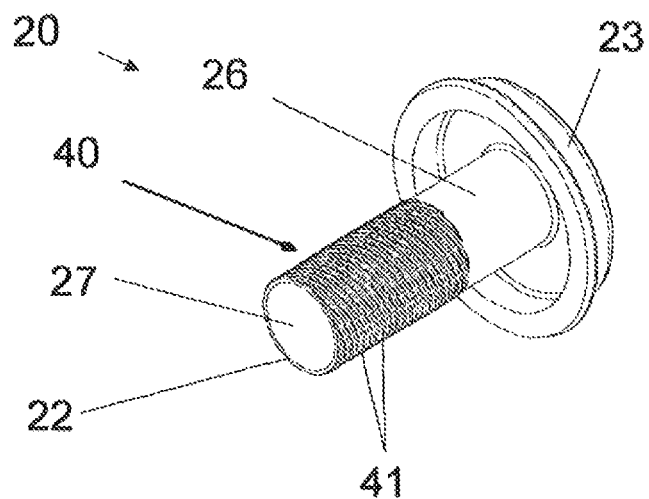
FIG. 2 shows a perspective view a valve shaft of the check valve unit of FIG. 1, wherein ten helical grooves are provided in the groove portion.

FIG. 2 shows the valve shaft 20 of the check valve unit 1 of FIG. 1 in a perspective view. At the proximal end 22 of the valve shaft 20, the cavity 27 can be seen. At the proximal side of the valve shaft 20, a groove portion 40 is provided at an outer circumferential surface of the valve shaft 20. Within the groove portion 40, ten helical grooves 41 are provided at the outer circumferential surface. Each of the helical grooves 41 exhibits two helical turns. In other words, each helical groove 41 winds two times around the valve shaft 20. Seen in the axial direction A, each helical groove 41 comprises an inner end opening at the proximal end 22 of the valve shaft 20 and an outer end opening facing towards the distal flange 23 of the valve shaft 20. Hence, the outer end opening constitutes a distal end of the respective helical groove 41.

The valve shaft 20 comprises a middle part 26 between the groove portion 40 and the distal flange 23. In the middle part 26, the diameter of the outer circumferential surface of the valve shaft 20 is smaller than in the groove portion 40 by an amount corresponding to a depth of the helical grooves 41. Hence, there is no edge or step for fluid flowing into or out of the outer end openings of the helical grooves 41.

As mentioned above, the proximal side of the valve shaft 20 with the groove portion 40 is inserted into the shaft bearing body 10 (see FIG. 1). Due to the reduced radial thickness of the valve shaft 20 in its middle part 26, a gap 90 is formed between the inner circumferential surface of the shaft bearing body 10 and the outer circumferential surface of the valve shaft 20 in the middle part 26. The gap 26 constitutes a fluid connection between the outside 70 of the shaft bearing body 10 and the distal ends of the helical grooves 41, namely their outer end openings. The cross-sectional area of the gap 90 perpendicular to the axial direction A is considerably larger than a total area of cross-section of all helical groves 41 perpendicular to the axial direction A. Therefore, there is no influence or at least no significant influence of the gap 90 on the damping characteristics of the check valve unit 1.

As the diameter of the outer circumferential surface of the valve shaft 20 is larger in the groove portion 40 than in the middle part 26, the groove portion 40 corresponds to an engagement portion of the valve shaft 20.

Independent of the axial position of the valve shaft 20, even when it is in its closing position, the groove portion 40 always remains completely in the interior of the shaft bearing body 10. In all axial positions of the valve shaft 20, the groove portion 40 (engagement portion) remains engaged with the shaft bearing body 10 over the whole length of the groove portion 40. In particular, over the complete range of axial motion of the valve shaft 20, the complete groove portion 40 is guided in a sliding area of the inner surface of the shaft bearing body (mounting portion 11), wherein the diameter of the inner circumferential surface of the shaft bearing body 10 is constant within the mounting portion 11.

Accordingly, independent of the axial position of the valve shaft 20, fluid flowing between the damping reservoir 50 and the outside 70 of the shaft bearing body 10 has to pass through the entire length of the helical grooves 41. The helical grooves 41 never protrude out of the interior of the mounting portion 11. Therefore, the damping effect of the helical grooves 41 and the damping characteristics of the check valve unit 1 are independent from the axial position of the valve shaft 20 and hence of the axial position of the valve head 25.

In other word, each helical groove 41 constitutes a single channel for the fluid and constitutes a fluid connection between the damping reservoir 50 and an outside 70.

As the inner circumferential surface of the shaft bearing body 10 in the mounting portion 11 slidably mounts the groove portion 40 (which therefore also constitutes the engagement portion of the valve shaft 20), said inner circumferential surface may be denoted as counterpart surface of the groove portion 40 and the helical grooves 41. Each single channel is formed by the respective helical groove 41, wherein the channel is confined by side surfaces of the helical groove 41 and is covered by the counterpart surface facing said helical groove 41.

The helical grooves 41 are arranged in parallel such that the fluid passes all helical grooves 41 in parallel at the same moment when flowing between the damping reservoir 50 and the outside 70. In other word, the fluid flow between the damping reservoir 50 and the outside 70 is split up into all parallel helical grooves 41.

In FIG. 1, the axial direction A is parallel to a direction of gravity. Hence, gravity forces the moving parts of the check valve unit 1 towards the valve seat 81. The gravitational force of the valve shaft assembly helps to close the check valve unit 1.

It has to be noted that the shaft bearing body 10, the valve shaft 20, and the valve head 25 are at least substantially rotationally symmetric. This facilitates the manufacture of the check valve unit 1.

If the check valve unit 1 is an open state, for example in the fully open state depicted in FIG. 1, fluid can enter the check valve unit 1 through the fluid inlet 83 of the housing 80, pass between the valve seat 81 and sealing surface 33 and further through a flow passage 85 constituted between an outer wall of the housing 80 and an outer wall of the body holder 81 to a fluid outlet 84 of the housing 80. Said flow passage 85 extends round about the body holder 82. Seen in a circumferential direction perpendicular to the axial direction A, the flow passage 85 is only interrupted by the three support arms 86.

The desired forward flow direction for the fluid from the fluid inlet 83 to the fluid outlet 84 is substantially parallel to the axial direction A.

The check valve unit 1 depicted in FIG. 1 is a straight flow valve. It is compact and exhibits low flow resistance for fluid flowing through it in the forward flow direction.

It is evident from FIG. 1 that the proximal side of the valve head 25, in particular a proximal side of the sealing holder 31, fittingly abuts on a distal end of the outer wall of the body holder 82 in the fully opened position (i.e. when the check valve unit 1 is fully open). No gap, edge, or step but a smooth transition is obtained between the valve head 25 and the outer wall of the body holder 82, said outer wall constituting an inner wall of the flow passage 85.

The valve head 25, the body holder 82 (disregarding the support arms 86), and the outer wall of the shaft bearing body 10 together form an at least substantially drop-shaped unit when the check valve unit 1 is fully open. Therefore, the flow resistance for fluid flowing through the check valve unit 1 from the fluid inlet 83 to the fluid outlet 84 is very small. This is beneficial for energy-efficient fluid circuits.

If a force of the fluid in the axial direction A to (keep) open the check valve unit 1, in particular caused by an upstream-side pressure, is lower than the sum of the resilient force of the spring 60 and the gravitational force of the valve shaft assembly, the valve shaft assembly moves in the axial direction A towards its closing position or remains in the closing position.

If the check valve unit 1 is in the closed state and if the upstream-side pressure is high enough that its resulting force acting on the head cap 34 exceeds the resilient force of the spring 60, the gravitational force of the valve shaft assembly, and a force due to a downstream-side pressure in the flow passage 85 (if any), then the valve shaft assembly is moved in the axial direction A away from its closing position. Hence, the sealing surface 33 is lift off from the valve seat 81 and fluid can pass between the sealing element 32 and the valve seat 81. In this way, the check valve unit 1 opens.

Due to its configuration with several (namely ten) helical grooves 41, the check valve unit 1 exhibits well-defined damping characteristics for movement of the valve shaft assembly.

If the valve shaft 20 moves in the axial direction A, a volume of the damping reservoir 50 is changed. To compensate for the volume change, fluid has to flow into the damping reservoir 50 from the outside 70 or, vice versa, to flow from the damping reservoir 50 to the outside 70. Fluid flowing between the damping reservoir 50 and the outside 70 of the shaft bearing body 10 is pressed through the helical grooves 41. As the fluid has a predetermined viscosity, this requires a certain force. In this way, a damping force counteracting movement of the valve shaft 20 in the axial direction A is exhibited.

In the groove portion 40, the ten helical grooves 41 occupy 50% of the outer circumferential surface of the valve shaft 20. Accordingly, the single grooves 41 are very small.

In the embodiment shown in FIGS. 1 and 2, for example, the depth of the helical grooves may be 0.2 mm. This means, that each helical grooves extends 0.2 mm in the radial direction towards the center line C starting from the outer circumferential surface of the valve shaft 20 in the groove portion 20. The valve shaft 20 is slidably mounted by the areas of the groove portion 40 between adjacent helical grooves 41. These ungrooved areas in the groove portion 40 hence constitute the sliding surface for mounting the valve shaft 20 within the mounting portion 11.

For example, in the embodiment shown in FIG. 1, a width of the single helical grooves 41 in the circumferential direction may be 0.5 mm.

As the respective helical grooves 41 are small, boundary effects are of considerably importance if fluid is pressed through the helical grooves 41 due to movement of the valve shaft 20 in the axial direction A. In particular, the Reynolds number for fluid flow between the valve shaft 20 and the shaft bearing body 10 is less than 2300. Accordingly, the damping force is proportional to the absolute value of a velocity of the movement of the valve shaft 20 in the axial direction A. This damping characteristic can only be obtained by providing several but small helical grooves 41 and by the helical grooves 41 occupying at least a considerable amount of the outer circumferential surface in the groove portion 40.

In particular, the damping force is not proportional to the velocity of the movement of the valve shaft 20 in the power of two as in other, known check valve units.

Therefore, fast movements of the valve shaft assembly are not exceedingly damped. With the well-defined damping characteristics, the low mass of the valve shaft assembly, the spring 60, and the gravitational force of the valve shaft assembly, the check valve unit 1 closes in less than 0.2 s if fluid is going to flow in a backward flow direction against the desired forward flow direction.

For example, in order to close the check valve unit 1, the valve shaft assembly might accelerate to a maximum velocity in 0.002 s. Then it is damped to at least nearly maintain the maximum velocity of 0.1 m/s. This results in a closing time of about 0.1 s.

On the other hand, as the damping force is proportional to the absolute value of the velocity of the valve shaft 20, sufficient damping force is exhibited even in cases of slow movements. In particular, the check valve unit 1 is not prone to oscillations if it is only partially open. Furthermore, the check valve unit 1 is not prone to instable opening or closing.

FIG. 3 shows a second embodiment of a check valve unit 100 according to the present invention, wherein a groove portion 140 with helical grooves 141 is located at an inner circumferential surface of a shaft bearing body 110. Apart from that, the check valve unit 100 basically corresponds to the check valve unit 1 described above. Components of the check valve unit 100, which correspond to those of the check valve unit 1 shown in FIG. 1 and FIG. 2, are denoted by the same reference signs and are not explained again.

FIG. 5 shows a valve shaft 120 of the check valve unit 100 in a perspective view. In this embodiment, no groove portion is provided at the valve shaft 120. At the proximal end 22 of the valve shaft 120, the cavity 27 can be seen. At a proximal side of the valve shaft 120, an engagement portion 128 is provided. Seen in the axial direction A, the engagement portion 128 extends from the proximal end 22 up to the middle part 26 of the valve shaft 120. As in the groove portion 40 of the check valve unit 1 (which also constitutes the engagement portion of the valve shaft 20 of the check valve unit 1), the diameter of the outer circumferential surface of the valve shaft 120 is larger in the engagement portion 128 than in the middle part 26.

A valve head 125 is disposed at a distal end 21 of the valve shaft 120. In particular, an annular, substantially frusto-conical sealing element 132 fixed to the distal end 21 of the valve shaft 120. The valve shaft 120 and the sealing element 132 constitute a valve shaft assembly of the check valve unit 100. The sealing element 132 exhibits a sealing surface 133. If the valve shaft assembly is in a closing position such that the check valve unit 100 is closed as in FIG. 3, the sealing surface 133 sealingly abuts the valve seat 81 of the housing 80.

In the check valve unit 100, a flow passage 185 is provided between the shaft bearing body and a wall of a housing 180.

Referring to FIG. 3 and FIG. 4, in the check valve unit 100, a groove portion 140 with four helical grooves 141 is disposed on the inner circumferential surface of the mounting portion 11. In this case, the groove portion 140 corresponds to the mounting portion 11. The helical grooves 141 exhibit the same functionalities and advantages as the helical grooves 41 of the check valve unit 1. However, the valve shaft 120 of the check valve unit 100 is easier to manufacture than the valve shaft 20 of the check valve unit 1.

In particular, each helical groove 141 forms a single channel constituting a fluid connection between the damping reservoir 50 and an outside 70.

As the outer circumferential surface of the valve shaft 120 in the engagement portion 128 is slidably engaged with the mounting portion 11 and hence the groove portion 140, said outer circumferential surface of the engagement portion 128 may be denoted as counterpart surface of the groove portion 140 and the helical grooves 141. Each single channel is formed by the respective helical groove 141, wherein the channel is confined by side surfaces of the respective helical groove 141 and is covered by the counterpart surface facing said helical groove 141.

When the valve shaft assembly is in an opened position, a gap is constituted between the inner circumferential surface of the mounting portion 11 and the outer circumference of the valve shaft 120 in the middle part 26 (not shown).

It is recognized from FIG. 3 that the engagement portion 128 of the valve shaft 120 is always in contact with a mounting portion 11 over its whole length (the whole length of the engagement portion 128). Although an area of engagement between the engagement portion 128 and the mounting portion 11 displaces when the valve shaft 120 is moved, a size of the area of engagement is independent of an axial position of the valve shaft 120. Hence, the damping characteristics are independent from said axial position as well.

A drain hole 112 is provided at a proximal end of the shaft bearing body 110. The drain hole 112 extends in the axial direction A through a wall of the shaft bearing body 110. It establishes a fluid connection from the damping reservoir 50 to the outside 70 of the shaft bearing body 110. The check valve unit 100 depicted in FIG. 3 is installed in a vertical configuration but upside down compared to the check valve unit 1 in FIG. 1. Hence, the gravitational force of the valve shaft assembly works against the resilient force of the spring 60. On the other hand, due to gravity, oil which has entered the damping reservoir 50 through the helical grooves 141 gathers at a lower, proximal end of the damping reservoir 50 where an inner opening of the drain hole 112 opens into the damping reservoir 50. If the valve shaft assembly moves proximally such that the check valve unit 100 opens or opens further, the volume of the damping reservoir 50 is decreased and the oil gathered is squeezed out of the damping reservoir 50 to the outside 70 through the drain hole 112. Hence, the damping characteristics of the check valve unit 100 are not impaired by oil. A corresponding drain hole can be provided in the shaft bearing body 10 of the check valve unit 1 in the same manner (not shown).

The actual length of each helical groove 41, 141 along its path is at least ten times a hydraulic diameter of the channel formed by said groove 41, 141, more preferably at least 25 times, more preferably at least 50 times.

An hydraulic diameter $d_H$ of an individual one of the channels is calculated from the cross-sectional area Ac of the channel an inner circumference $O_c$ of said channel as follows: $d_H=4*A_c/O_c$.

As the channels are covered by the respective counterpart surface in the embodiments described above, a respective portion of the counterpart surface covering the individual helical groove 41, 141 has to be considered when calculated the hydraulic diameter $d_H$ of the channel formed by the respective helical groove 41, 141, in particular for calculating the inner circumference $O_c$ of this channel.

The check valve unit 100 exhibits similar damping characteristics as the check valve unit 1 and the corresponding advantages apply accordingly.

Figure 6:
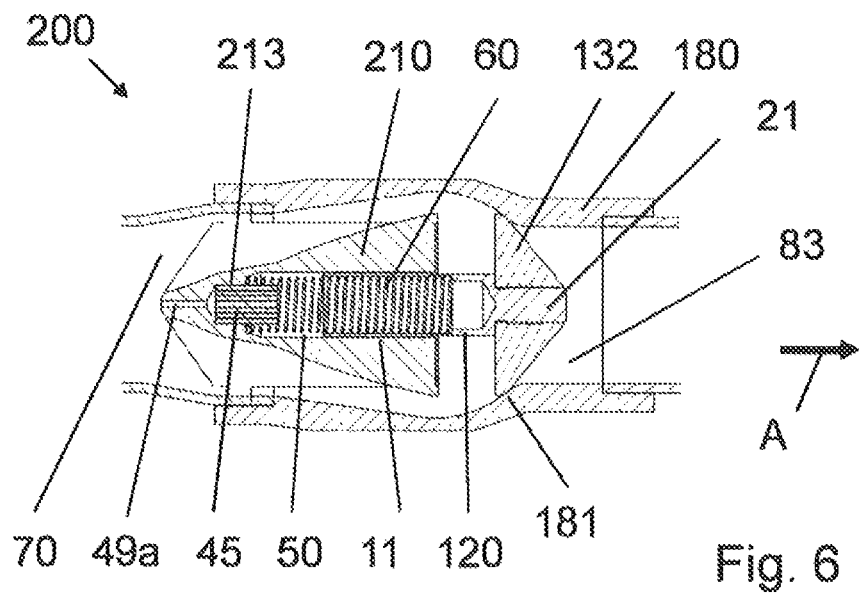
FIG. 6 shows a cross-sectional view of a third embodiment of a check valve unit according to the present invention with an insert comprising a plurality of channels, wherein the insert is fixed directly to and within the shaft bearing body and is arranged at a proximal end of the damping reservoir.
Figure 7:
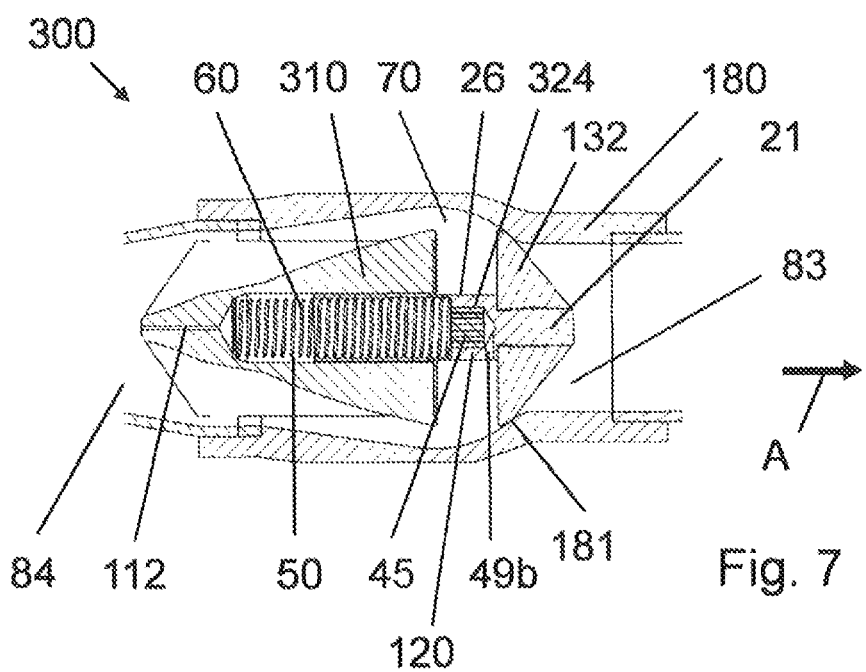
FIG. 7 shows a cross-sectional view of a fourth embodiment of a check valve unit according to the present invention with an insert comprising a plurality of channels, wherein the insert is fixed within the valve shaft and is arranged at a distal end of a cavity within the valve shaft.
Figure 10:
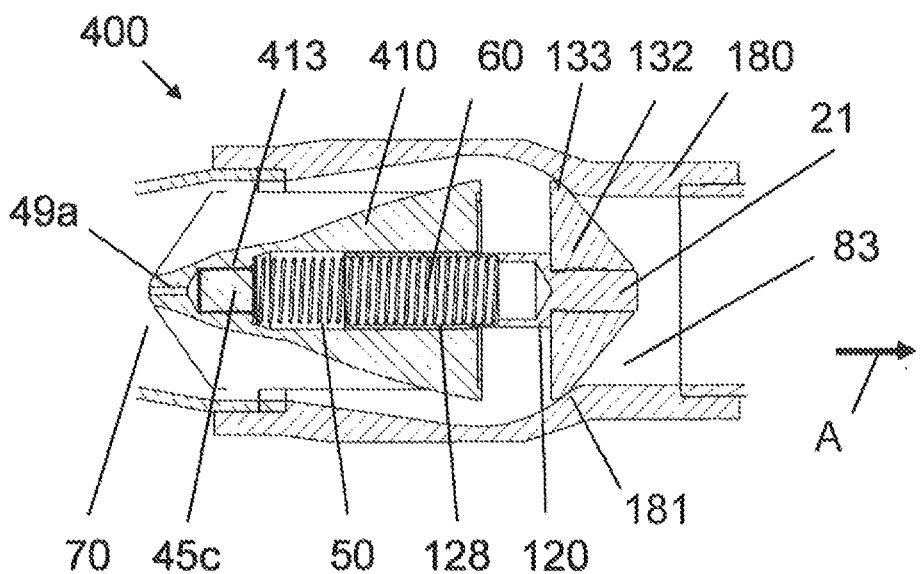
FIG. 10 shows a cross-sectional view of a fifth embodiment of the of a check valve unit according to the present invention, wherein the channels are formed by straight grooves located at a radially outer surface of an insert, wherein the insert is fixed directly to and within the shaft bearing body and is arranged at the proximal end of the damping reservoir.

FIG. 6, FIG. 7, and FIG. 10 show further embodiments of check valve units 200, 300, 400 according to the present invention. The check valve units 200, 300, 400 are of the same basic structure and exhibit similar damping characteristics as the check valve unit 100. The corresponding advantages apply accordingly. Identical elements are denoted by the same reference signs. However, in the check valve units 200, 300, 400, the channels are formed in other ways than in the check valve unit 100.

A third embodiment of a check valve unit 200 according to the present invention is depicted in FIG. 6. Different from the check valve unit 100 of FIGS. 3 to 5, the check valve unit 200 includes an insert 45 comprising a plurality of channels. The insert 45 is fixed in a receiving portion 213 of the shaft bearing body 210 by means of press-fit. In more detail, the insert 45 is arranged at a proximal end of the damping reservoir 50 in the interior of the shaft bearing body 210. Seen in the axial direction A, a conduit 49a is provided proximally to the insert 45. The conduit 49a extends along the axial direction A between from a proximal end of the shaft bearing body 210 towards the receiving portion 213 with the insert 45. It establishes a fluid connection between the outside 70 and proximal openings of the channels in the insert 45. Distal openings of the channels open directly into the damping reservoir 50. In other words, the conduit 49a is provided in series with the parallel channels of the insert. Fluid can flow from the damping reservoir 50 to the outside 70 through all channels in parallel and further through the conduit 49a (and vice versa). In FIG. 6, the check valve unit 200 is in a closed state.

In contrast, in a fourth embodiment of a check valve unit 300 according to the present invention according to FIG. 7, the insert 45 is fixed to a receiving portion 324 within the valve shaft 21 by means of press-fit. In more detail, the insert 45 is arranged at a distal end of the cavity of the valve shaft 21. A conduit 49b is provided distally to the insert 45. The conduit 49b establishes a fluid connection between the outside 70 and distal openings of the channels in the insert 45. Proximal openings of the channels open directly into the damping reservoir 50. In other words, the conduit 49b is provided in series with the parallel channels of the insert. The conduit 49b substantially extends in the radial direction from the radial center of the valve shaft and opens at the outer circumferential surface of the valve shaft 21 in the middle part 26 of the valve shaft 21. Fluid can flow from the damping reservoir 50 to the outside 70 through all channels in parallel and further through the conduit 49b (and vice versa). In FIG. 7, the check valve unit 300 is in a closed state.

Like the check valve unit 100 according to FIG. 3 to FIG. 5, the check valve unit 300 shown FIG. 7 comprises an additional drain hole 112. It should be noted that a diameter of the drain hole 112 is much smaller than diameters of the conduits 49a, 49b.

A flow resistance of the conduits 49a, 49b is smaller than a flow resistance of the insert 45, respectively. Hence, the conduits 49a, 49b do not impair the flow of fluid between the damping reservoir 50 and the outside 70. In particular, there is no significant influence of the conduits 49a, 49b on the damping characteristics of the respective check valve unit 200, 300.

Figure 8:
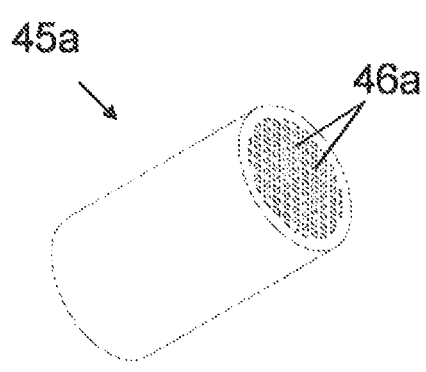
FIG. 8 shows a perspective view of a first embodiment of an insert that can be used in the embodiments according to FIG. 6 and FIG. 7, the insert comprising a plurality of channels extending in parallel through the channel, wherein most of the channels have a rectangular cross-section perpendicular to an axial direction.

FIG. 8 shows a first embodiment of an insert 45a that can be used as the insert 45 in the check valve unit 200 according to FIG. 6 or the check valve unit 300 according to FIG. 7. The insert 45a is of cylindrical shape and extends along a longitudinal direction. For example, it may have a length of 20 mm along the longitudinal direction. The insert 45a includes a plurality of channels 46a, which extend in parallel through insert 45a along the longitudinal direction. The insert 45a may comprise a number of 89 channels 46a, which are arranged in a matrix-like pattern. Most of the channels have a quadratic cross-section perpendicular to the longitudinal direction. In FIG. 7, some of the channels 46a near to a radially outer surface of the insert 45a (i.e. an outer surface of the insert 45a seen in a radial direction perpendicular to the longitudinal direction) are smaller and of different shape. The shape and a cross-sectional area Ac of each channel 46a do not change along the longitudinal direction. When the insert 45a is mounted as the insert 45 in FIG. 6 or FIG. 7, the longitudinal direction corresponds to the axial direction A.

However, in other embodiments, all channels may have the same shape.

The channels 46a of the insert 45a having a quadratic cross-section may have lateral width (i.e. side lengths perpendicular to the longitudinal direction) of 0.2 mm. Hence, these channels 46a have a hydraulic diameter of 0.2 mm and a cross-sectional area of 0.04 mm². As the length of all channels 46a is equal to the length of the insert 45a and hence 20 mm, the length of each of the quadratic-shaped channels is 100 times the hydraulic diameter of the channel.

The non-quadratic-shaped channels have the same lengths but a smaller hydraulic diameter. Hence, the factor is even higher for them.

Figure 9:
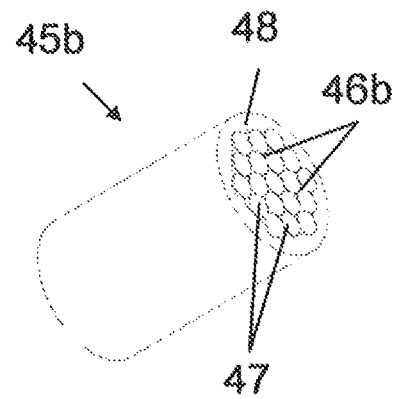
FIG. 9 shows a perspective view of a second embodiment of an insert that can be used in the embodiments according to FIG. 6 and FIG. 7, the insert comprising a plurality of channels extending in parallel through the channel, wherein the channels are formed between cylindrical rods, wherein the rods are fixed in an outer sleeve of the insert.

FIG. 9 shows a second embodiment of an insert 45b that can be used in the check valve unit 200 of FIG. 6 or in the check valve unit 300 of FIG. 7 as well. Similar to the insert 45a, the insert 45b comprising a plurality of channels 46b extending in parallel through the insert 45b along a longitudinal direction thereof. However, in this case, the individual channels are formed by empty spaces between cylindrical rods 47. The rods 47 are fixed within an outer sleeve 48 of the insert 45b. Hence, the insert 45b constitutes one single unit that can be mounted in the check valve unit 200 or the check valve unit 300. As an example, the channels 46b have a hydraulic diameter $d_H$ of 0.1027 mm and a cross-sectional area of 0.0403 mm². A length of the insert 45b and hence of the channels 46b along the longitudinal direction may be 10 mm. Therefore, the length of each of the channels 46b is about 100 times the hydraulic diameter of the channel 46b.

Figure 12:
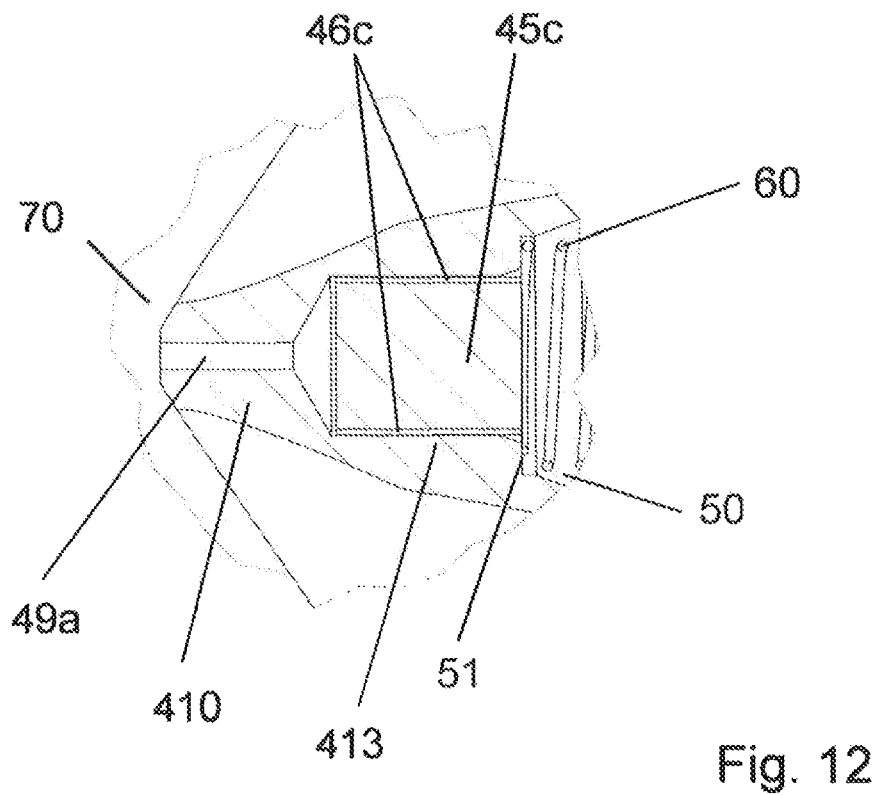
FIG. 12 shows a magnified section of FIG. 10 with the insert.

FIG. 10 shows a fifth embodiment of the of a check valve unit 400 according to the present invention. The check valve unit 400 is very similar to the check valve unit 200 of FIG. 6. Hence, only the differences will be pointed out in the following. The receiving portion 413 of the shaft bearing body 410 is a bit longer in the axial direction A such that an insert 45c is positioned completely inside the receiving portion 413. The insert 45c does not protrude out of the receiving portion 413, in particular not into the damping reservoir 50. The insert 45c is fixed in the mounting portion 413 by means of press-fit. FIG. 12 shows a magnified section of FIG. 10 with the insert 45c.

Figure 11:
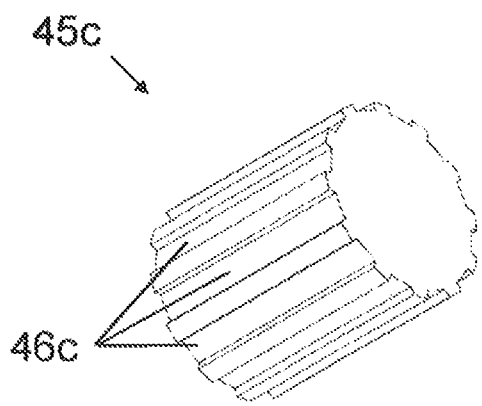
FIG. 11 shows a perspective view of the insert of the embodiment of FIG. 10 in a perspective view.

In FIG. 11, the insert 45c is shown in a perspective view. The insert 45c has a substantially cylindrical shape and extends a longitudinal direction. In FIG. 10, the longitudinal direction of the insert 45c corresponds to the axial direction A.

Straight grooves 46c are formed on a radially outer surface of the insert 45c (i.e. outer surface of the insert 45c seen in the radial direction perpendicular to the longitudinal direction of the insert 45c). Each straight groove 46c extends parallel to the longitudinal direction and along a whole length of the insert 45c. In FIG. 11, twelve straight grooves 46c are shown. However, there may be another number of straight grooves 46c, for example 20.

The straight grooves 46c are equally distributed on the radially outer surface.

In this example, each of the straight grooves 46c has a width of 0.5 mm in a circumferential direction perpendicular to the longitudinal direction and the radial direction and a depth of 0.1 mm in the radial direction. A length of the insert 45c and hence of all the straight grooves 46c is 10 mm.

When the insert 45c is fixed within the receiving portion 413 of the check valve unit 400 as depicted in FIG. 10 and FIG. 12, parallel channels are formed by the straight grooves 46c. In more detail, each channel is confined by surfaces of one of the straight grooves 46c and the inner circumferential surface of the shaft bearing body 410 in the receiving portion 413 facing said straight groove 46c. Therefore, a volume of the straight groove 46c constitutes the channel. The channels serve as flow restrictions for fluid flowing between the damping chamber 50 and the outside 70 and exhibit excellent damping characteristics.

Where an insert 45, 45a, 45b, 45c is used, a difference between an outer diameter of the insert 45, 45a, 45b, 45c and an inner diameter of the receiving portion 213, 324 should be about 0.5%. In any case, it may be 0.7% at the maximum.

If channels are formed by an outer circumference of an insert, said diameter difference preferably less than 40% of a channel depth. For example, in the case of the insert 45c, the diameter difference is preferably less than 40% than the depth of the straight grooves 46c. Hence, if the depth of the straight grooves is 0.2 mm as noted above, the diameter difference is preferably 0.08 mm at the maximum. However, the optimum difference may also depend on the width of the channels and/or a distance between the channels in the circumferential direction. The larger the width and/or the distance of the channels, the larger the diameter difference shall be. With the optimum diameter difference, the insert 45, 45a, 45b, 45c can be fixed into the receiving portion 213, 324 easily but the insert 45, 45a, 45b, 45c will nevertheless remain safely and reliably fixed in the receiving portion 213, 324.

The check valve unit 400 with the insert 45c can be manufactured in a comparatively cost-efficient and easy manner.

The insert 45c with the straight grooves 46c or a similar insert with straight grooves and, optionally, with additional channels like the channels 46a of the insert 45a or the channels 46b of the insert 45b can be used as insert 45 in the check valve unit 200 and the check valve unit 300. Furthermore, regarding the insert 45b, additional channels could be provided within one, some, or all of the rods 47, if less fluid resistance is required.

For example, the check valve units 1, 100, 200, 300, 400 can be used in cooling and/or refrigeration systems, respectively. Additionally or alternatively, they can be used for centrifugal compressors, in particular for protecting centrifugal compressors in the case of surge.

In particular, the check valve units 1, 100, 200, 300, 400 are configured for use in a refrigerant circuit, wherein R134a, R410a or CO2 are used as a refrigerant. In typical operating conditions, the viscosity of R134a and R410a at the check valve unit 1 is in the range from 10 µPa·s to 20 µPa·s. The number, shape, and the dimensions of the helical grooves 41, 141, the channels 46a, 46b, and the straight grooves 46c as well as the damping reservoir 50 of the check valve units 1, 100, 200, 300, 400 are adapted to this viscosity range in order to obtain the desired damping characteristics, respectively.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A check valve unit, comprising:
   a shaft bearing body comprising an at least substantially cylindrical mounting portion extending along an axial direction (A);
   a valve shaft mounted in the mounting portion, wherein the valve shaft extends along the axial direction (A) and is displaceable along the axial direction (A);
   a valve head comprising a sealing surface, wherein the valve head is disposed on a distal end of the valve shaft in the axial direction (A), the distal end facing away from the mounting portion;
   a damping reservoir inside the shaft bearing body, wherein a volume of the damping reservoir is changed by movement of the valve shaft with regard to the shaft bearing body along the axial direction (A);
   wherein at least two channels are provided in parallel in a groove portion, each of the channels constituting a fluid connection between the damping reservoir and an outside, wherein the damping reservoir is, apart from the channels, at least substantially enclosed,
   wherein each channel has a length being at least ten times an effective hydraulic diameter of the respective channel; and
   wherein the at least two channels provided in parallel are formed by at least two helical grooves provided in a single surface of the groove portion.

2. The check valve unit according to claim 1, wherein the helical grooves occupy at least 20% of the surface of the groove portion.

3. A check valve unit, comprising:
   a shaft bearing body comprising an at least substantially cylindrical mounting portion extending along an axial direction (A);
   a valve shaft mounted in the mounting portion, wherein the valve shaft extends along the axial direction (A) and is displaceable along the axial direction (A);
   a valve head comprising a sealing surface, wherein the valve head is disposed on a distal end of the valve shaft in the axial direction (A), the distal end facing away from the mounting portion;
   a damping reservoir inside the shaft bearing body, wherein a volume of the damping reservoir is changed by movement of the valve shaft with regard to the shaft bearing body along the axial direction (A);
   wherein the check valve unit further includes an insert, wherein the insert is fixed to and within the shaft bearing body and is arranged at a proximal end of the damping reservoir;
   wherein at least two channels are formed by the insert and provided in parallel, each of the channels constituting a fluid connection between the damping reservoir and an outside, wherein the damping reservoir is, apart from the channels, at least substantially enclosed,
   wherein each channel has a length being at least ten times an effective hydraulic diameter of the respective channel; and
   wherein the at least two channels provided in parallel are formed by at least two helical grooves provided in a single surface of the insert.

* * * * *